United States Patent [19]
Hill

[11] 3,727,873
[45] Apr. 17, 1973

[54] ADJUSTABLE CRANE SEAT

[76] Inventor: John H. Hill, 6255 S.W. 98th Street, Miami, Fla. 33156

[22] Filed: July 19, 1971

[21] Appl. No.: 163,968

[52] U.S. Cl....................................248/418, 297/349
[51] Int. Cl..............................................F16m 11/08
[58] Field of Search.....................248/415, 416, 418, 248/425, 282; 297/349, 240

[56] References Cited

UNITED STATES PATENTS

| | | | |
|---|---|---|---|
| 677,195 | 6/1901 | Frederick | 297/240 |
| 2,650,647 | 9/1953 | Macknight | 248/415 |
| 3,191,400 | 6/1965 | Swanson | 297/349 |
| 3,542,424 | 11/1970 | Bingley | 297/349 |

*Primary Examiner*—Marion Parsons, Jr.
*Attorney*—John Cyril Malloy

[57] ABSTRACT

A vehicle and equipment seat support to allow one operator to efficiently operate the carrying vehicle and any mounted equipment where the controls of the mounted equipment are remotely mounted on the vehicle at a station different from that at which the vehicle controls are located, said combination including a first main seat support, a swingable arm with the seat rotatably journalled on the end of the arm, and belt means interconnecting the seat and the main support standard, so that when the swingable arm is rotated, it will travel through an arc about the main seat support and, simultaneously, the seat will be rotated relative to an axis through the main seat support.

6 Claims, 4 Drawing Figures

PATENTED APR 17 1973 3,727,873

INVENTOR.
JOHN H. HILL
BY John Cyril Malloy
ATTORNEY.

3,727,873

ADJUSTABLE CRANE SEAT

BACKGROUND OF THE INVENTION

As is perhaps well known, it is quite often necessary for a vehicle, such as a crane, to require special controls at a control panel or station which is separate from that of the control station for operating the vehicle. Such vehicles often require two operators, or at best, are inconvenient in that the operator is required to move from one seat to another seat depending upon whether he is operating the vehicle or the equipment carried by it. This invention is of a vehicle and equipment seat combination which is swingable from a position to control the vehicle to a position to control the equipment carried by the vehicle, without the necessity of the operator changing seats.

It is an object of this invention to allow one operator to efficiently operate the carrying vehicle and any mounted equipment where the controls for the mounted equipment are at a station remote from the vehicle control station.

It is another object of this invention to provide an improved combination seat support which requires relatively small mechanical power created by an operator exerting a side force on the seat to swing it between a station to control the operation of the vehicle or to control equipment on the vehicle in which it is possible for the operator to swing anywhere within a 360° arc and which includes means for rotatable adjustment of the seat in its swinging movement so as to be facing any desired position at any point within a 360° arc, so that the operator can efficiently operate the controls of the mounted equipment.

It is a general and further object of this invention to provide improved means comprising a swingable rotatable adjustment type vehicle and equipment seat which is simple in construction and inexpensive to manufacture and provides a wide range of selection for the location of equipment control panels depending upon the particular vehicle and the equipment being carried by the vehicle.

DETAILED DESCRIPTION OF THE DRAWINGS

Figure 1:
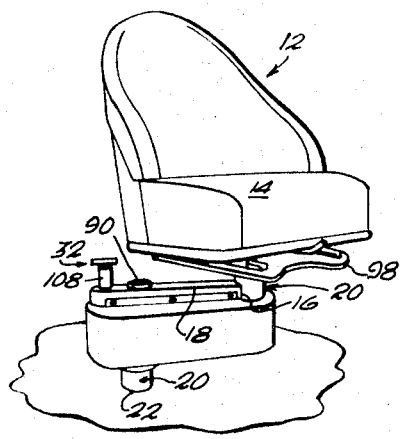
FIG. 1 is a perspective view of the vehicle and equipment seat combination.
Figure 2:
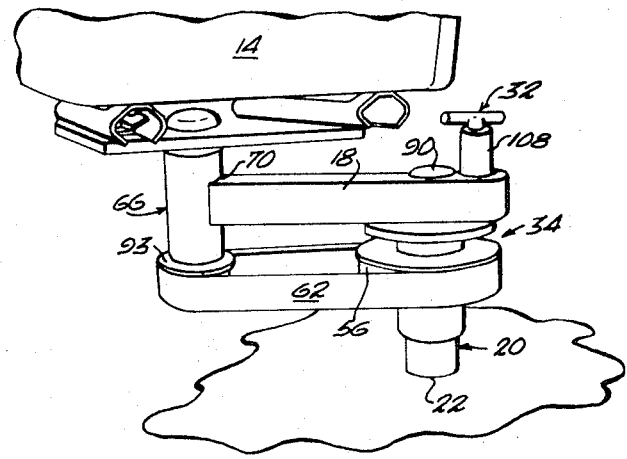
FIG. 2 is an enlarged view in perspective of a portion of the seat support combination.

Referring to the drawings wherein like reference characters designate like or corresponding parts throughout the several views, the numeral 12 generally designates the equipment and vehicle seat combination. It is seen to include a seat 14 for the operator which is journalled to the end 16 of a swingable arm 18, which in turn is journalled to a fixed main seat support 20. The seat support is secured to the floor of the vehicle as at 22.

Figure 4:
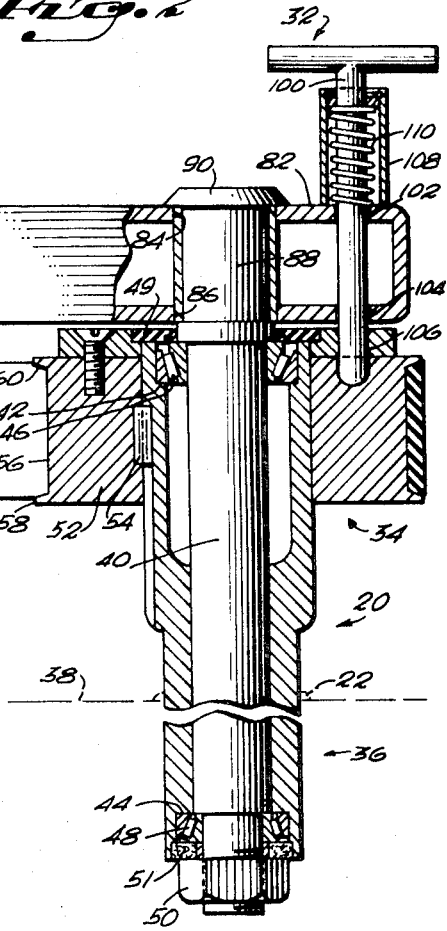
FIG. 4 is a schematic view illustrating the operation of the combination, to be described more fully hereinafter.
Figure 4:
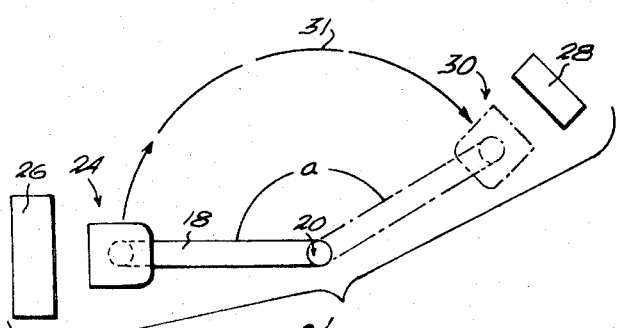

Initially it will be helpful to refer to FIG. 4 to more readily understand the action of the seat combination. When the seat is oriented in the position designated by the numeral 24, it faces the vehicle control panel 26. The operator may turn to the equipment control panel 28 by pushing against the floor with his feet to swing the arm 18 and consequently, his seat in the direction of the arrowed line 31 about the main fixed seat support 20 to the position 30 in which he faces the equipment control panel 28. It will be noted that, when he faces the vehicle control panel 26, the seat generally faces radially, but that, when he is the position 30, facing the equipment control panel 28, his seat faces somewhat aslant to the radius of swing; in other words the seat is rotatably adjusted by several degrees relative to a vertical axis through the end zone of the arm in the swinging movement of the arm. Belt means are provided to transmit torque to the seat and regulate the amount of rotatable adjustment of the seat between the vehicle operating position 24 and the equipment operating position 30; and lock means to limit swinging movement of the arm between the two positions are preferably provided.

Figure 3:
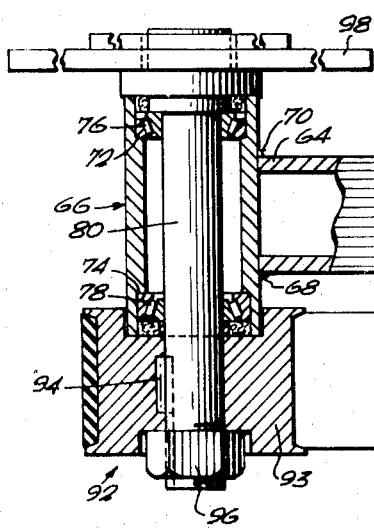
FIG. 3 is a view in cross section of FIG. 2.

Referring more in detail to the drawings and particularly to FIG. 3, it is seen that the main seat support or standard 20 includes an upper portion 34 and a lower portion 36. It is also seen that the lower portion 36 is adapted to be secured to the support surface 38 by suitable means 22. As shown in this embodiment, the standard 20 is generally tubular and receives a depending main shaft portion 40 carried by the arm 18. The hollow tube or column of the main seat support or standard is provided with shoulders 42 and 44 to receive and nest an upper and lower bearing means, 46 and 48, preferably of the tapered cup type provided with a seal, as at 49 and 51. The nut 50, threadably received on the main seat support shaft 40 at the lower end, provides keeper means for the shaft, it being threaded for bearing adjustment. The upper portion of the main seat support or standard 20 comprises a belt support means 52, which is keyed to the standard 20, as at 54; and in the preferred embodiment, it comprises a pulley wheel 56 with rims 58 and 60 to hold the belt 62, preferably of the gear or chain type, in the position shown.

The swinging arm extends above the upper portion 34 of the standard 20 and fixed pulley wheel 56 in a generally radially extending direction from the main shaft portion 40. The distal end zone 64 of the arm or support beam 18 defines a standard or seat spindle 66. In the preferred embodiment, the seat spindle 66 is welded, as at 68 and 70, to the end of the arm or beam 18 and includes an upper and lower recessed portion 72 and 74 to receive tapered upper and lower bearing means 76 and 78, which journal a support shaft 80 of the seat 14 for rotation of the seat about a vertical axis through the spindle. The inner end zone 82 of the arm or beam 18 preferably includes an upper and lower aligned hole 84 and 86 to accommodate snug receipt of a hub 88 to secure the main shaft portion 40 to the arm, the shaft being preferably headed as at 90 and suitably secured to the arm.

The support shaft 80 of the seat includes a lower portion 92 which extends outwardly of the seat spindle 66 and includes a rimmed pulley wheel 93 keyed to it as at 94; and it is secured to the shaft by suitable means such as the nut 96. The seat is connected to the seat support shaft 80 by suitable means, such as through a mounting plate 98 for rotating with the seat support shaft 80.

Loop or belt means 62, it is seen, interconnect the pulley wheels 56 and 93 of the fixed standard or main seat support and the rotatable or auxiliary seat support shaft 80, respectively. The pulley wheels and belt means are preferably of the gear type, and serve to transmit torque to cause adjustment of rotation of the seat relative to the fixed seat support, as an operator swings his seat from the vehicle control panel 26 to the equipment control panel 28. It is seen that the fixed gear belt or chain pulley wheel may be regarded as a sun gear and the swingable rotatable pulley wheel 93 as a planet gear which is adapted to be moved by means of the belt in response to movement of the swinging arm by the operator. It is seen that by relative adjustment of the diameter of the pulley wheels, the amount of rotational adjustment of the seat may be controlled. In other words, since the circumference of the fixed pulley is $\pi D$, and as the arm swings through an arc measured by an angle a, FIG. 4, a circumferential length of the belt, equal to $\pi Da/360°$ will be released from one side of the fixed pulley and be taken up on the other side, which length will be released and available to rotate the planet gear a number of degrees of adjustment dependent upon its diameter, $B_2$ with the proper gear belt ratio selection between the fixed gear belt pulley and pinion or planet gear belt pulley, it is possible for the operator to swing anywhere within a 360° arc, and be facing any desired position at any point within that arc, to efficiently operate the controls of the mounted equipment on the vehicle.

Lock means 32 are provided to limit swinging movement of the arm between the vehicle and equipment control positions. In the preferred embodiment, this comprises a lock pin 100 which is carried in aligned through holes 102 and 104 in a proximal end zone 82 of the arm, with the end of the pin being adapted to nest in recesses such as 106 in the upper portion of the fixed main seat support or standard 20. Spring biasing means are preferably provided to normally hold the pin 100 in a position and, when swinging movement is in progress, to urge it toward a position to catch, stop and lock the seat at a preselected position. The biasing means in the preferred embodiment comprises a spring housing 108 and a spring 110 captivated in the housing and arranged to urge the pin in the extended position shown.

It is thus seen that this structure provides for a vehicle and equipment seat combination which is operable by an operator exerting a side force on the seat. The mechanical leverage provides for the operation with a relatively small amount of force being required to swing and rotate the seat. It will also be seen that the relationship of the driving position of the carrying vehicle to the equipment operating position is determined by the structure set forth by the ratio of the gear belt, pulleys and the length of the support beam or arm.

What is claimed is:

1. An equipment and vehicle seat combination comprising:
    a fixed first standard with an upper portion and a lower portion being adapted for rigid connection to a support surface on the vehicle;
    an arm member journaled to the first standard above the upper portion of said first standard, said arm having an outer portion;
    a second standard rigidly secured on the outer portion of said arm;
    a rotatable seat support journaled to the second standard and said seat support having a lower portion, rotatable therewith, below said arm and said second standard;
    loop means encircling the upper portion of said fixed first standard and said rotatable lower portion of said seat support to transmit torque, manually applied to said seat support, to said arm member causing rotatable adjustment of said seat support relative to said second standard and rotatable adjustment of said arm member relative to said first standard; and
    a seat means connected to said seat support for rotatable movement with said arm about said first standard and rotatable adjustment relative to said second standard.

2. The combination as set forth in claim 1 wherein positioning means are provided to interconnect said arm and the upper portion of said first standard at predetermined positions of swing of said arm.

3. The combination as set forth in claim 1 wherein the upper portion of said first standard comprises a fixed pulley wheel encircled by said loop means and the lower portion of said rotatable seat support comprises a pulley wheel encircled by said loop means.

4. The combination as set forth in claim 1 wherein said first standard comprises a tubular member and said arm includes a depending support shaft journalled in the column of said tubular member.

5. The combination as set forth in claim 1 wherein spring biased positioning means are provided, said means to interengage said arm and the upper portion of said first standard at predetermined positions of swing of said arm and to catch and lock said arm in said position on swinging movement by an operator.

6. The combination as set forth in claim 1 wherein the distal end of said arm is provided with a rigidly connected seat spindle, comprising said second standard, and said rotatable seat support is journalled in said spindle.

* * * * *